US006995655B2

(12) United States Patent
Ertin et al.

(10) Patent No.: US 6,995,655 B2
(45) Date of Patent: Feb. 7, 2006

(54) METHOD OF SIMULTANEOUSLY READING MULTIPLE RADIO FREQUENCY TAGS, RF TAGS, AND RF READER

(75) Inventors: Emre Ertin, Lewis Center, OH (US); Richard M. Pratt, Richland, WA (US); Michael A. Hughes, Pasco, WA (US); Kevin L. Priddy, Upper Arlington, OH (US); Wayne M. Lechelt, West Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 393 days.

(21) Appl. No.: 10/263,809

(22) Filed: Oct. 2, 2002

(65) Prior Publication Data

US 2004/0198222 A1    Oct. 7, 2004

(51) Int. Cl.
    H04Q 5/22      (2006.01)
    H04B 7/212     (2006.01)
    H04L 12/43     (2006.01)

(52) U.S. Cl. .............. 340/10.2; 370/442; 370/458
(58) Field of Classification Search ............ 340/10.2; 370/442, 458; 455/417
    See application file for complete search history.

(56) References Cited

U.S. PATENT DOCUMENTS

| 4,075,632 A |   | 2/1978  | Baldwin et al. ............ 343/6.8 |
|-------------|---|---------|-------------------------------------|
| 4,352,183 A |   | 9/1982  | Davis et al. ............... 371/33  |
| 4,360,810 A |   | 11/1982 | Landt ........................ 343/6.5 |
| 4,940,974 A | * | 7/1990  | Sojka ........................ 340/10.2 |
| 5,307,349 A | * | 4/1994  | Shloss et al. ............... 340/10.2 |
| 5,450,492 A |   | 9/1995  | Hook et al. .................. 380/28 |
| 5,530,702 A |   | 6/1996  | Palmer et al. ............. 370/85.3 |
| 5,550,547 A |   | 8/1996  | Chan et al. .................... 342/42 |
| 5,649,296 A |   | 7/1997  | MacLellan et al. ......... 455/38.2 |
| 5,757,923 A |   | 5/1998  | Koopman, Jr. ................ 380/46 |
| 5,777,561 A |   | 7/1998  | Chieu et al. ............ 340/825.54 |
| 5,850,187 A |   | 12/1998 | Carrender et al. .......... 340/10.6 |
| 5,883,582 A |   | 3/1999  | Bowers et al. .......... 340/825.54 |
| 5,940,006 A |   | 8/1999  | MacLlellan et al. ..... 340/825.54 |
| 5,952,922 A | * | 9/1999  | Shober ....................... 340/10.4 |
| 5,986,570 A |   | 11/1999 | Black et al. ............ 340/825.54 |
| 5,995,019 A |   | 11/1999 | Chieu et al. ............ 340/825.54 |
| 6,091,319 A |   | 7/2000  | Black et al. ................ 340/10.2 |
| 6,130,623 A |   | 10/2000 | MacLellan et al. ..... 340/825.54 |
| 6,177,861 B1|   | 1/2001  | MacLellan et al. ......... 340/10.1 |
| 6,236,315 B1|   | 5/2001  | Helms et al. ............. 340/572.7 |
| 6,265,962 B1|   | 7/2001  | Black et al. ................ 340/10.2 |
| 6,307,848 B1|   | 10/2001 | Wood, Jr. .................... 370/329 |

(Continued)

OTHER PUBLICATIONS

Finkenzeller, Klaus, "Radio-Frequency indentification Fundamentals and Applications", *RFID Handbook* Chapter 8, pp. 151-159 (Jan. 2002).

(Continued)

*Primary Examiner*—Brian Zimmerman
*Assistant Examiner*—Clara Yang
(74) *Attorney, Agent, or Firm*—Well St. John P.S.

(57) ABSTRACT

An RF tag system, comprising an RF reader configured to issue a plurality of different RF commands and to provide a continuous RF illumination field, and a plurality of RF tags respectively including a permanent identification; wherein the plurality of RF tags are configured to respond to a certain RF command from the RF reader by transmitting their respective identifications by way of backscatter modulation of the RF illumination field, and wherein the RF tags are further configured to perform the responding by way of respective independently selected random radio frequencies and timeslots from respective pre-defined ranges of radio frequencies and timeslots.

15 Claims, 7 Drawing Sheets

U.S. PATENT DOCUMENTS

| | | | |
|---|---|---|---|
| 6,366,260 B1 | 4/2002 | Carrender | 343/866 |
| 6,377,203 B1 | 4/2002 | Doany | 342/42.51 |
| 6,538,563 B1 * | 3/2003 | Heng | 340/10.2 |
| 6,661,336 B1 * | 12/2003 | Atkins et al. | 340/10.2 |
| 6,738,025 B2 | 5/2004 | Carrender | 343/860 |
| 6,745,008 B1 | 6/2004 | Carrender et al. | 455/41.1 |
| 6,765,476 B2 | 7/2004 | Steele et al. | 340/10.4 |
| 2002/0149468 A1 | 10/2002 | Carrender et al. | 340/5.61 |
| 2002/0149484 A1 | 10/2002 | Carrender | 340/572.4 |
| 2005/0083963 A1 | 4/2005 | Holeman, Sr. | 370/447 |

OTHER PUBLICATIONS

International Standard, ISO/IEC, "Part 2: Mechanisms Using Symmetry Encipherment Algorithms", *Information Technology—Security Techniques—Entity Authentication*, #ISO/IEC 9798-2:1999(E), 2nd Ed., pp 1-11 (Jul. 15, 1999).

Agilent Technologies, "Schottky Diode Voltage Doubler, Application Note 956-4", 2 pages (1999).

U.S. Patent Appn. filed Oct. 2, 2002, entitled "Radio Frequency Identification Device Communications Systems, Wireless Communication Devices, Wireless Communication Systems, Backscatter Communication Methods, RAdi Frequency Identification Device Communication Methods and a Radio Frequency Identification Device", by Michael A. Hughes and Richard M. Pratt.

U.S. Patent Appn. filed Oct. 2, 2002, entitled "RFID System and Method Including Tag ID Compression", by Michael A. Hughes and Richard M. Pratt.

U.S. Patent Appn. filed Oct. 2, 2002, entitled "System and Method to Identify Multiple RFID Tags", by Michael A. Hughes and Richard M. Pratt U.S. Patent Appn. filed Oct. 2, 2002, entitled, "Radio Frequency Identification Devices, Backscatter Communication Device Wake-Up Methods, Communication Device Wake-Up Methods and a Radio Frequency Identification Device Wake-Up Method", by Richard M. Pratt and Michael A. Hughes.

U.S. Patent Appn. filed Oct. 2, 2002, entitled "Wireless Communication Systems, RAdio Frequency Identification Devices, Methods of Enhancing a Communications Range of a Radio Frequency Identification Device, and Wireless Communication Methods", by Richard M. Pratt and Steven B. Thompson.

U.S. Patent Appn. filed Oct. 2, 2002, entitled "WIreless Communications Devices, Methods of Processing a Wireless Communications Signal, Wireless Communication Synchronization Methods and a Radio Frequency Identification Device Communication Method", by Richard M. Pratt and Steven B. Thompson.

U.S. Patent Appn. filed Oct. 2, 2002, entitled "Wireless Communications Systems, Radio Frequency Identification Devices, Wireless Communications Methods, and Radio Frequency Identification Device Communications Methods", by Richard M. Pratt and Steven B. Thompson.

U.S. Patent Appn. filed Oct. 2, 2002, entitled "A Challenge-Based Tag Authentication Model", by Michael A. Hughes and Richard M. Pratt.

U.S. Appl. No. 09/589,001, filed Jun. 6, 2000, R. W. Gilbert et al.; not published or issued.

U.S. Appl. No. 09/588,997, filed Jun. 6, 2000, R. W. Gilbert et al.; not published or issued.

U.S. Appl. No. 09/588,998, filed Jun. 6, 2000, C. L. Carrender et al.; not published or issued.

* cited by examiner

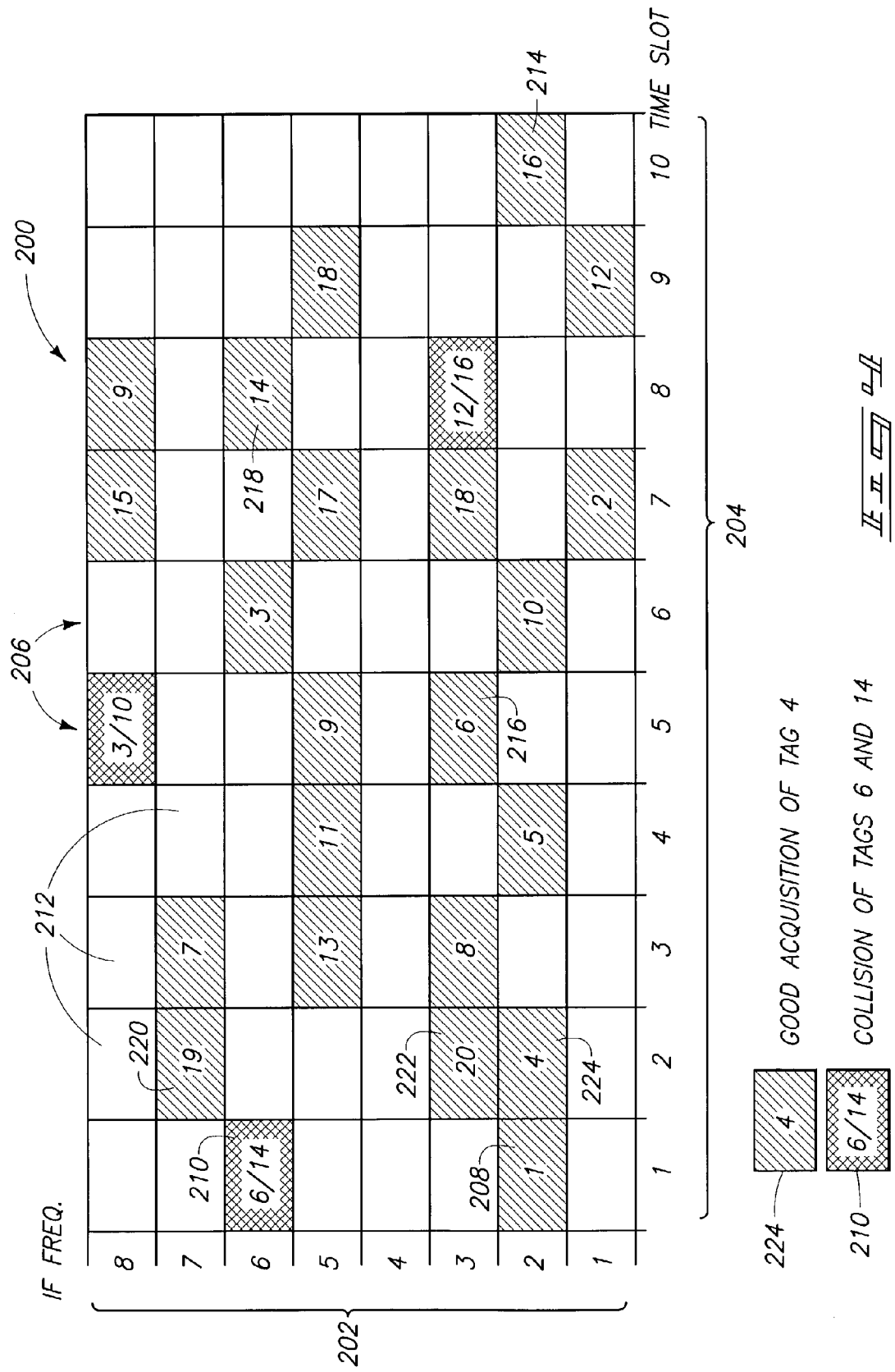

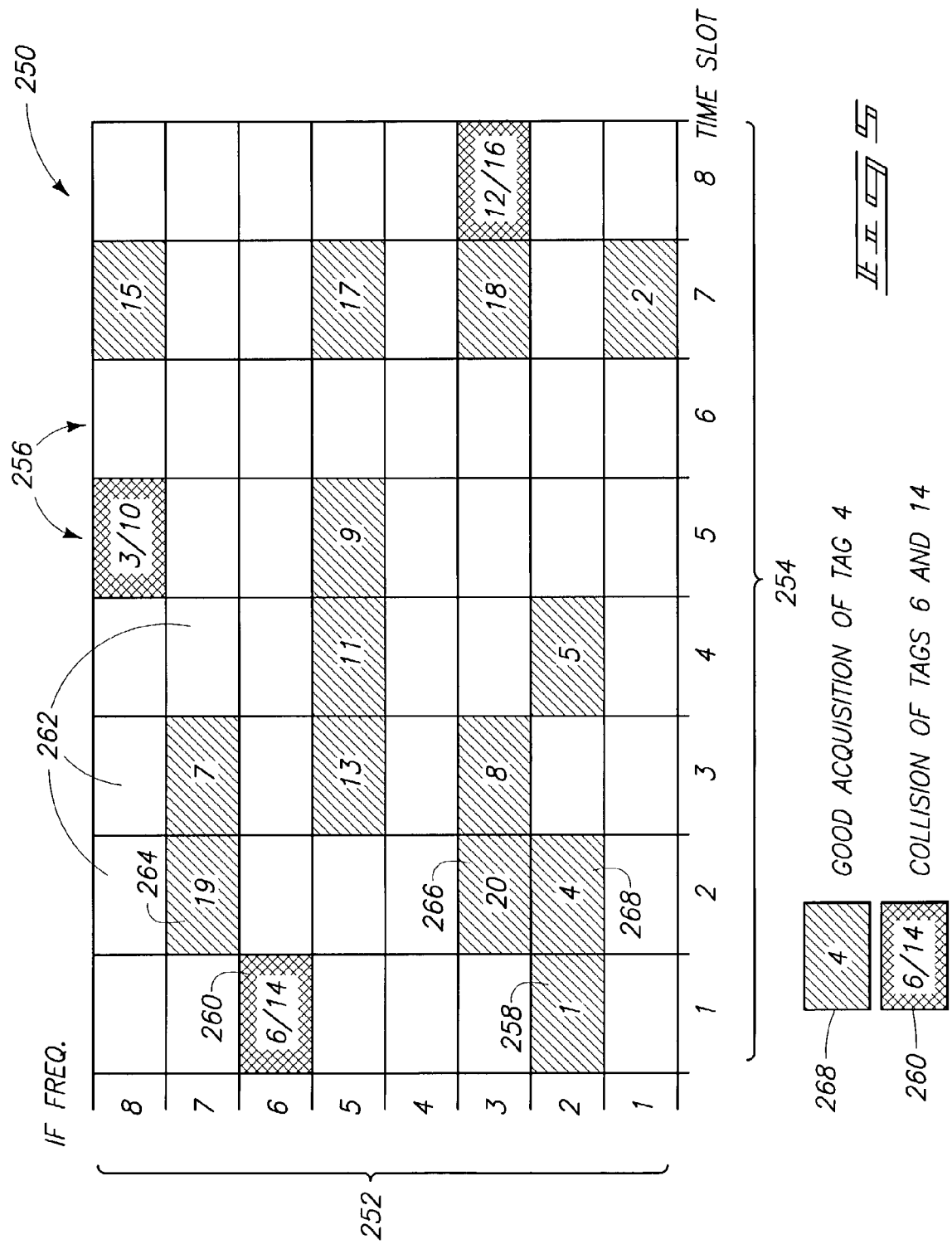

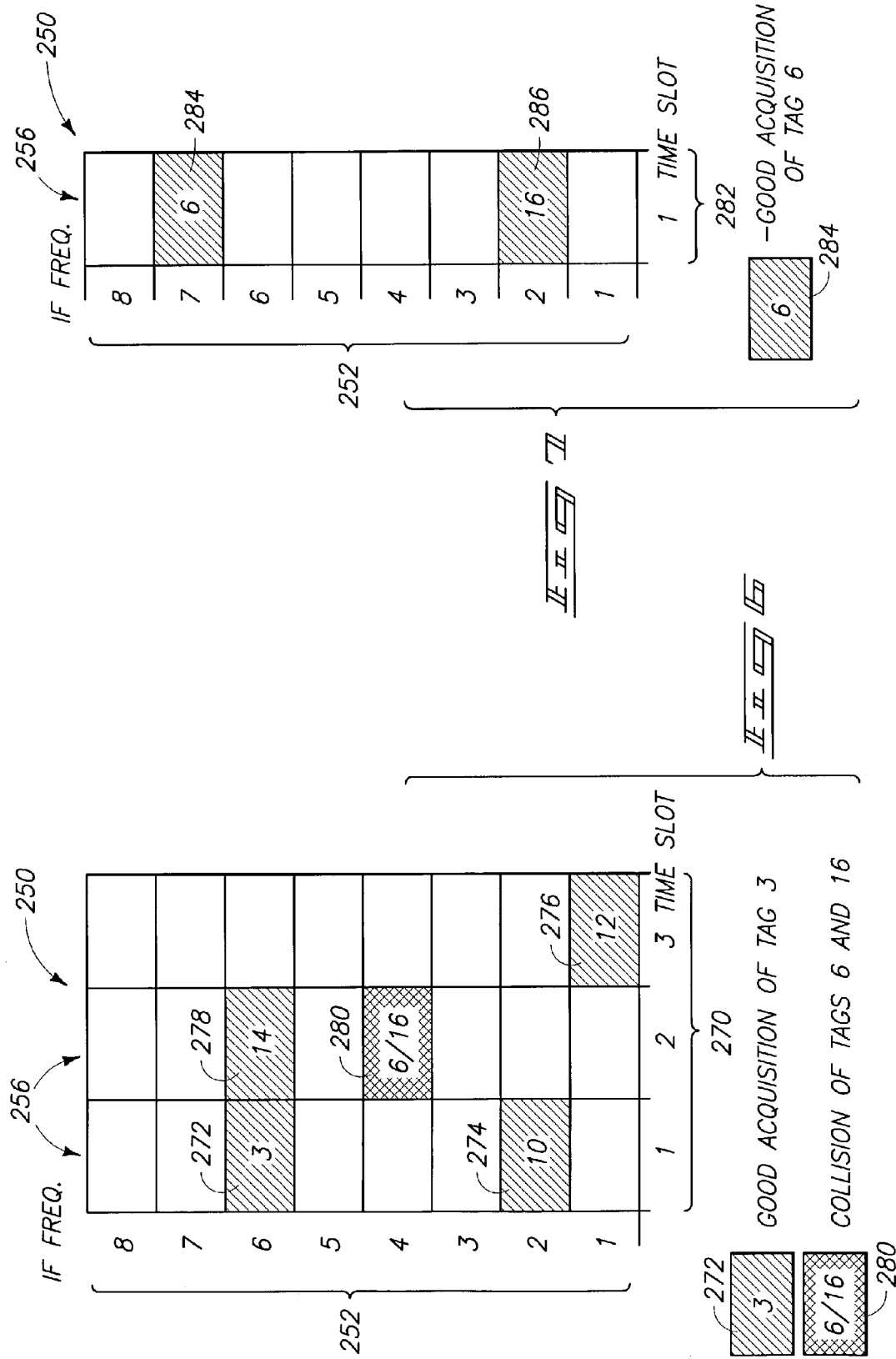

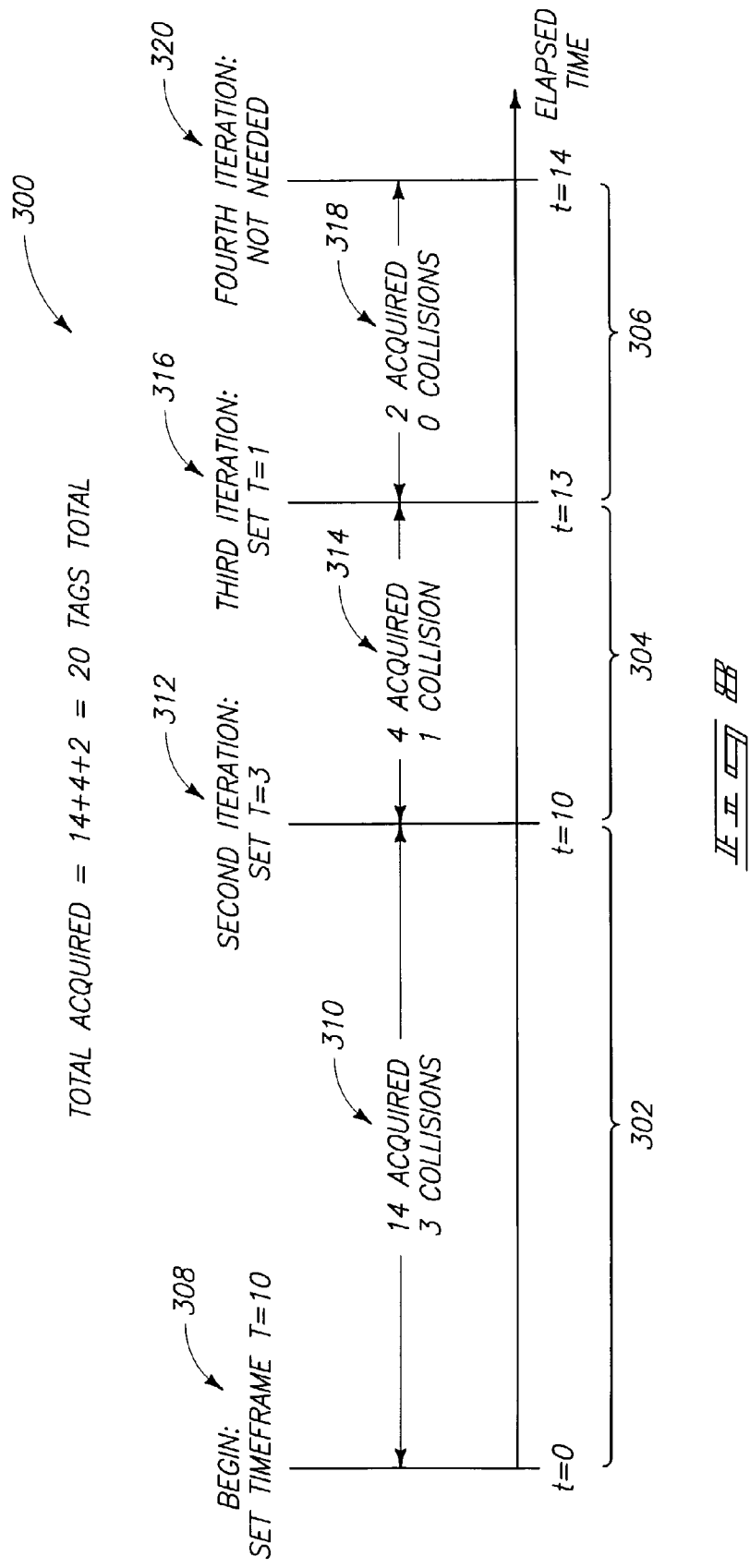

METHOD OF SIMULTANEOUSLY READING MULTIPLE RADIO FREQUENCY TAGS, RF TAGS, AND RF READER

TECHNICAL FIELD

The invention relates to radio frequency identification tags. More particularly, the invention relates to a system and method of identifying radio frequency identification tags within an area.

BACKGROUND OF THE INVENTION

Radio frequency identification tags (RF tags) are utilized in a wide variety of applications: inventory control; tracking personnel within a facility; secured access control; locating stored articles; etc. As business and industry become more dependant upon RF tagging, the population of tags within a given area or facility increases correspondingly.

For example, the arrival of a large quantity of inventory at a storage facility can introduce a proportionate number of individual RF tags (each including a unique identification, as well as other possible data) which require scanning so as to be recorded in the relevant database. The time required to perform this scanning under established methods can be formidable, in view of the quantity of tags to be scanned and recorded.

As another example, RF tags may be affixed to luggage at an airport at the time of traveler check-in. Under such a circumstance, it is important to quickly route a tagged article to the corresponding aircraft, often with a number of other articles, by way of conveyors, luggage trains, handling personnel, etc., and to verify that each article has arrived at the proper aircraft. It is desirable under such time-critical conditions to automatically scan and verify each of several pieces of luggage as they are being loaded, freeing handling personnel from the scanning task.

What is needed is a system and method for expeditious, automatic scanning and identification of a plurality of RF tags within the working proximity of a reader, such as in scenarios where the reader does not know the identities of the tags present in the field and sequential polling is therefore not an option.

SUMMARY OF THE INVENTION

The invention provides a method of identifying RF tags, the method comprising issuing a wireless command using a reader, requesting that RF tags identify themselves; illuminating a plurality of RF tags with a radio frequency field using the reader; respective RF tags randomly selecting a radio frequency and a timeslot from a plurality of predefined radio frequencies and timeslots; respective RF tags issuing a wireless response to the command, including information identifying the tag, using the selected radio frequency and timeslot; receiving the wireless responses with the reader; and issuing wireless acknowledgements from the reader to RF tags that have been successfully identified responsive to the receiving.

Another aspect of the invention provides a method of identifying RF tags using a reader, the method comprising issuing a wireless command, using the reader, requesting that RF tags identify themselves; providing a radio frequency illumination field using the reader; monitoring a plurality of radio frequencies simultaneously during each of a plurality of consecutive timeslots using the reader; and receiving a plurality of wireless responses responsive to the command, at different ones of the radio frequencies and timeslots, using the reader.

Yet another aspect of the invention provides a radio frequency identification system, comprising an RF reader configured to issue an RF command requesting that RF tags identify themselves, to provide a continuous RF illumination field, and to receive responses in any of a plurality of predefined timeslots and frequencies; and a plurality of RF tags respectively including an identification number; wherein the plurality of RF tags are configured to respond to the RF command from the RF reader by transmitting their respective identification numbers by way of backscatter modulation of the RF illumination field, and wherein the RF tags are further respectively configured to select a frequency from the plurality of predefined frequencies, to select a timeslot from a plurality of predefined timeslots, and to respond using the selected frequency and timeslot.

Still another aspect of the invention provides an RF tag for use with a reader, the RF tag comprising circuitry configured to selectively transmit an RF backscatter modulation communication, including data identifying the RF tag, responsive to an RF discovery command from the reader, wherein the circuitry is further configured to randomly select an IF frequency and a timeslot from a plurality of predetermined possible IF frequencies and timeslots prior to transmitting the RF backscatter modulation communication to the reader.

Yet another aspect of the invention provides a reader for use with an RF tag in an RFID system, the reader comprising: circuitry configured to selectively transmit a plurality of different types of RF messages including a discovery command having timeframe information, indicating the timeframe during which a response will be processed, and configured to provide an RF illumination field after transmitting a discovery command, wherein the circuitry is further configured to selectively provide a time synchronization signal within the RF illumination field, wherein the circuitry is further configured to simultaneously monitor a plurality of IF frequencies, and wherein the circuitry is further configured to selectively issue an RF acknowledgement message, acknowledging successful identification on an RF tag, responsive to successfully receiving identification data from an RF tag on one of the plurality of IF frequencies by way of backscafter modulation of the RF illumination field.

BRIEF DESCRIPTION OF THE DRAWINGS

Preferred embodiments of the invention are described below with reference to the following accompanying drawings.

FIG. 4 is a time and frequency plot illustrating operation according to another embodiment of the invention.

FIG. 5 is a time and frequency plot illustrating operation according to still another embodiment of the invention.

FIG. 6 is continuation of the plot of FIG. 5.

FIG. 7 completes the plot of FIGS. 5 and 6.

FIG. 8 is a timeline substantially corresponding to the process of FIG. 5.

DETAILED DESCRIPTION OF THE PREFERRED EMBODIMENTS

Figure 1:
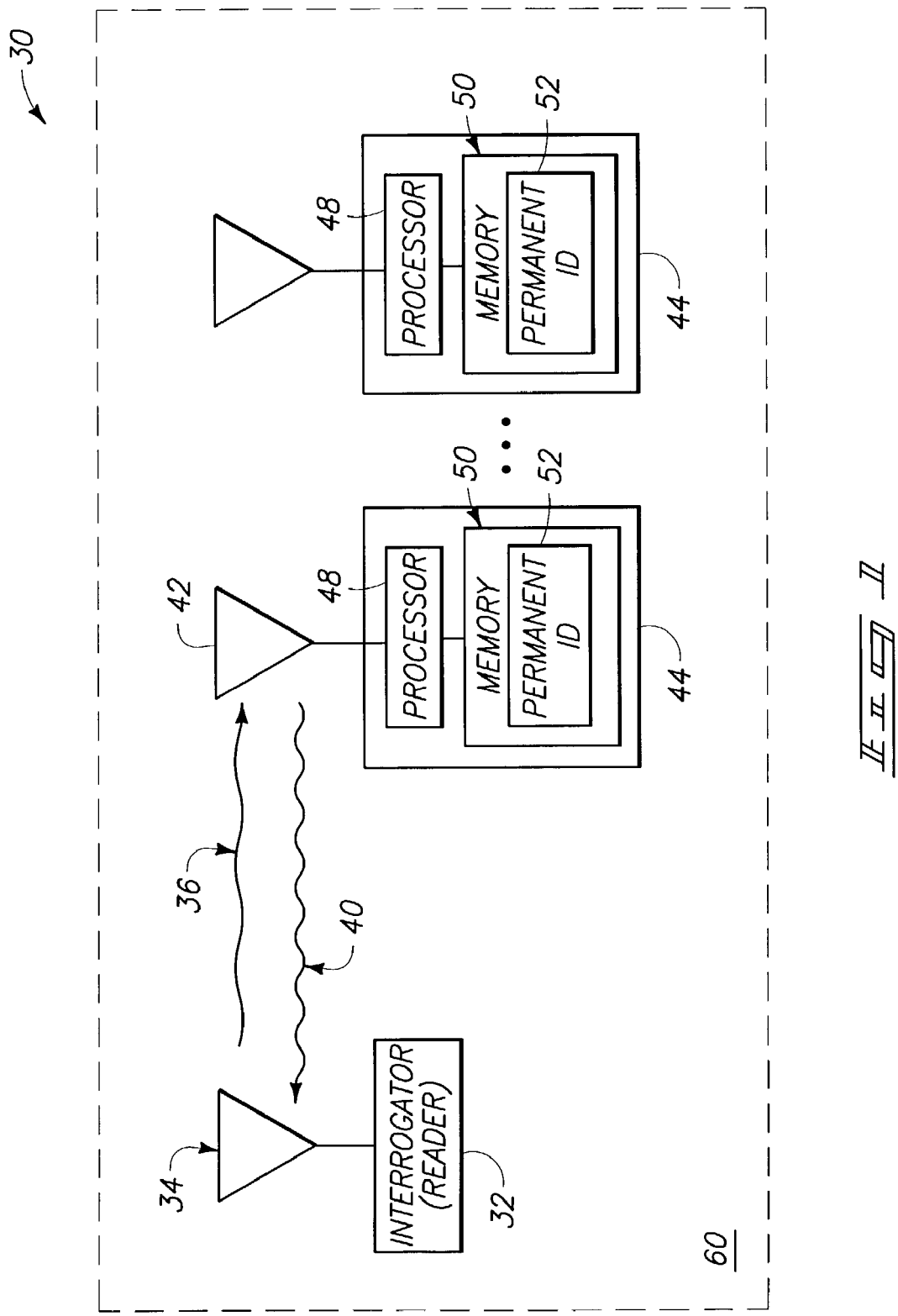
FIG. 1 is an illustration of a radio frequency tag system according to one embodiment of the invention.

Attention is directed to the following commonly assigned applications, which are incorporated herein by reference: U.S. Patent Application Ser. No. 10/263,826 entitled "Radio Frequency Identification Device Communication Systems, Wireless Communication Devices, Backscatter Communication Methods and Radio Frequency Identification Device Communication Methods" by inventors Mike A. Hughes and Richard M. Pratt; U.S. Patent Application Ser. No. 10/2263,873, entitled "RFID System and Method Including Tag ID Compression", by inventors Mike A. Hughes and Richard M. Pratt; U.S. Patent Application Ser. No. 10/264,078, entitled "System and Method to Identify Multiple RFID Tags", by inventors Mike A. Hughes and Richard M. Pratt; U.S. Patent Application Ser. No. 10/263,940, entitled "Wireless Communication Devices, Radio Frequency Identification Devices, Backscatter Communication Device Wake-Up Methods and Radio Frequency Identification Device Wake-Up Methods", by inventors Richard Pratt and Mike Hughes; U.S. Patent Application Ser. No. 10/263,997, entitled "Wireless Communication Systems, Radio Frequency Identification Devices, Methods of Enhancing a Range of Radio Frequency Device, and Wireless Communication Methods", by inventors Richard Pratt and Steven B. Thompson; U.S. Patent Application Ser. No. 10/263,670, entitled "Wireless Communications Devices, Methods of Processing a Wireless Communication Signal, Wireless Communication Synchronization Methods and a Radio Frequency Identification Device Communication Method", by inventors Richard M. Pratt; U.S. Patent Application Ser. No. 10/263,656, entitled "Wireless Communications Systems, Radio Frequency Identification Devices, Wireless Communications Methods, and Radio Frequency Identification Device Communications Methods", by inventors Richard Pratt and Steven B. Thompson; U.S. Patent Application Ser. No. 10/263,635, entitled "A Challenged-Based Tag Authentication Model, by inventors Mike A. Hughes" and Richard M. Pratt; U.S. patent application Ser. No. 09/589,001, filed Jun. 6, 2000, entitled "Remote Communication System and Method", by inventors R. W. Gilbert, G. A. Anderson, K. D. Steele, and C. L. Carrender; U.S. patent application Ser. No. 09/802,408; filed Mar. 9, 2001, entitled "Multi-Level RF Identification System"; by inventors R. W. Gilbert, G. A. Anderson, and K. D. Steele; U.S. patent application Ser. No. 09/833,465, filed Apr. 11, 2001, entitled "System and Method for Controlling Remote Device", by inventors C. L. Carrender, R. W. Gilbert, J. W. Scott, and D. Clark; U.S. patent application Ser. No. 09/588,997, filed Jun. 6, 2000, entitled "Phase Modulation in RF Tag", by inventors R. W> Gilbert and C. L. Carrender; U.S. patent application Ser. No. 09/589,000, filed Jun. 6, 2000, entitled "Multi-Frequency Communication System and Method", by inventors R. W. Gilbert and C. L. Carrender; U.S. patent application Ser. No. 09/588,998; filed Jun. 6, 2000, entitled "Distance/Ranging by Determination of RF Phase Delta", by inventor C. L. Carrender; U.S. patent application Ser. No. 09/797,539, filed Feb. 28, 2001, entitled "Antenna Matching Circuit", by inventor C. L. Carrender; U.S. patent application Ser. No. 09/833,391, filed Apr. 11, 2001, entitled "Frequency Hopping RFID Reader", by inventor C. L. Carrender.

FIG. 1 shows an RF communication system 30 that employs backscatter signals. The RF communication system 30 includes a reader or interrogator 32 that includes an antenna 34 through which the reader can transmit an interrogation signal 36 to an RF tag 44. The RF tag modulates the continuous wave interrogation signal 36 to produce a backscatter response signal 40 that is transmitted back to the interrogator 32. The signal 40 can include an identification code stored in memory 50, or other data. While FIG. 1 shows only two tags 44, there would typically be multiple tags 44 in use, capable of communicating with the reader 32.

Figure 2:
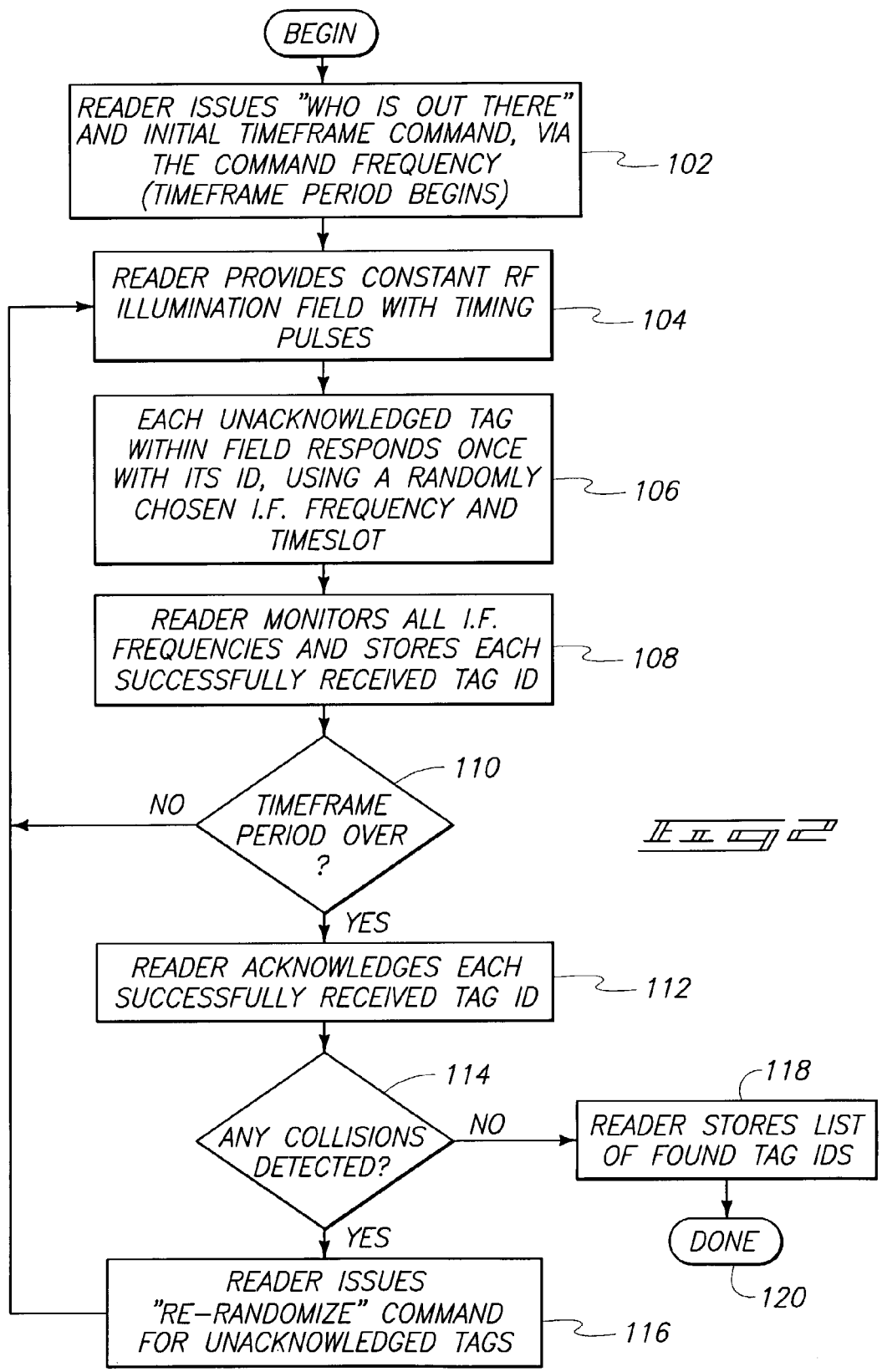
FIG. 2 is a flowchart illustrating operation in accordance with one embodiment of the invention.

The embodiment shown in FIG. 1, the RF tag 44 includes an antenna 42 coupled to a modulator defined by processor 48. The tag 44 includes a switch coupled between the antenna 42 and processor 48. In the embodiment of FIG. 2, the switch is included in the processor 48. Alternatively, the switch can be a switch external to the processor 48, such as an n-channel MOS transistor, a p-channel MOS transistor, a bi-polar transistor, or any of numerous other types of switches.

In FIG. 1, a modulating signal from the processor 48 is input to the antenna 42 to cause the antenna to alternately reflect or not reflect. One item that can be transmitted from the tag to the reader is a tag ID 52 that is stored in memory 50 of the RF tag 44. In one embodiment, after receiving a command, the reader sends a carrier wave or interrogation signal 36 that is received by the antenna 42, and that signal is selectively reflected or not reflected back by the antenna 42 by the tag 44 shorting or not shorting dipole halves of the antenna 42 to produce portions of the response signal 40 (backscatter communications). Other communication methods are possible.

It will be appreciated that the depiction of the RF tag 44 in FIG. 1 is one embodiment only; RF tags are well-known in the art. For example, U.S. Pat. No. 4,075,632 to Baldwin et al., which is incorporated herein by reference, discusses in detail circuit structures that could be used to produce the RF tag 44, if modified as described below.

Similarly, the internal structures of the interrogator 32 are not shown in FIG. 1. For example, the interrogator 32 can be the receiver described in U.S. Pat. No. 4,360,810 to Landt, which is incorporated herein by reference, modified as described below.

Each tag 44 includes a unique tag ID 52 which may be, for example, an identification number or value that is different from the identification number or value of the other tags 44. The tag ID 52, in one embodiment, is a permanent ID. The tag ID 52 is stored within a location of memory 50 (typically non-volatile memory) or could be defined by fusible links, for example. The memory 50 can be separate from the processor 48 or can be included in the processor 48.

FIG. 2 is a flowchart illustrating logic embodied in the reader for discovering (i.e., identifying) the RF tags 44 within area 60, generally corresponding to one possible simplex-mode of communication. The area 60 can be, for example, defined by the maximum possible communication range between the reader 32 and the RF tags 44. In step 102, the reader 32 issues a "who is out there" or discovery command, requesting that all as-yet unidentified RF tags 44 within area 60 enter a discovery mode and transmit their respective tag IDs 52. The reader additionally issues a timeframe command which informs RF tags 44 of the period of the discovery timeframe (i.e., length of time that the reader 32 will be monitoring for responses).

In step 104, the reader illuminates (i.e., energizes) the area 60 with continuous RF energy at a particular frequency, having time pulses to allow RF tags 44 to remain synchronized with reader 32. The RF tags 44 use this illumination to reply by way of backscatter modulation.

In step 106, each RF tag 44 within the area 60 randomly selects a timeslot within the discovery timeframe, and selects an IF frequency (i.e., channel) from multiple possible pre-defined ranges of IF frequencies simultaneously monitored by reader 32. A timeslot is an interval controlled by the reader during which a tag responds. Each RF tag 44 then responds once by backscatter modulating the signal 40 to convey its tag ID 52, during the selected timeslot and at the selected IF frequency.

In step 108, which is at least partially overlapping with step 104 and overlapping with step 106, the reader 32 reads and stores each of the successfully received tag IDs 52 by simultaneous monitoring of all pre-defined IF frequencies. During step 108, the reader also keeps track of any response "collisions" that occur—that is, the occurrence of two or more tags attempting to respond on the same IF frequency and in the same timeslot.

In step 110, the reader determines if the discovery time period has elapsed. If not, the reader 32 proceeds to step 104. If so, the reader 32 proceeds step 112.

In step 112, the reader 32 sequentially acknowledges the receipt of each successfully received tag ID 52 by transmitting a "discovered you" (i.e., acknowledgment) signal 36 to each discovered RF tag 44. Discovered RF tags 44 respond by leaving the discovery mode.

In step 114, the reader 32 decides if any collisions were detected in step 108. If so, the reader 32 proceeds to step 116. If not, then the reader proceeds to step 118 by storing the list of discovered RF tags 44 tag IDs 52. After performing step 118, the reader 32 ends execution, in step 120, of the logic shown in FIG. 2.

In step 116, the reader 32 issues a "re-randomize" command to those RF tags 44 whose tag IDs 52 were not successfully received (i.e., those RF tags 44 which were not acknowledged). Steps 104, 106, 108,110, 112, 114 and 116 are then repeated in an iterative fashion, as needed, until no collisions are detected in step 108. After this iterative sequence exhaustively receives the tag IDs 52 of all RF tags. 44 in area 60, that can be read, the reader 32 ends execution of the logic shown in FIG. 2.

The logic shown in FIG. 2 is appropriate for use in readers 32 that are not capable of simultaneous receiving and transmission by way of an RF carrier (otherwise known as simplex-mode communication). In one embodiment, the reader 32 utilizes timeframes and timeslots of the same respective duration for each iteration of the discovery process. An embodiment of the invention subsequently described makes use of simultaneous bidirectional RF communication (i.e., duplex-mode), as well as a timeframe optimization technique, to accelerate the RF tag discovery process.

Figure 3:
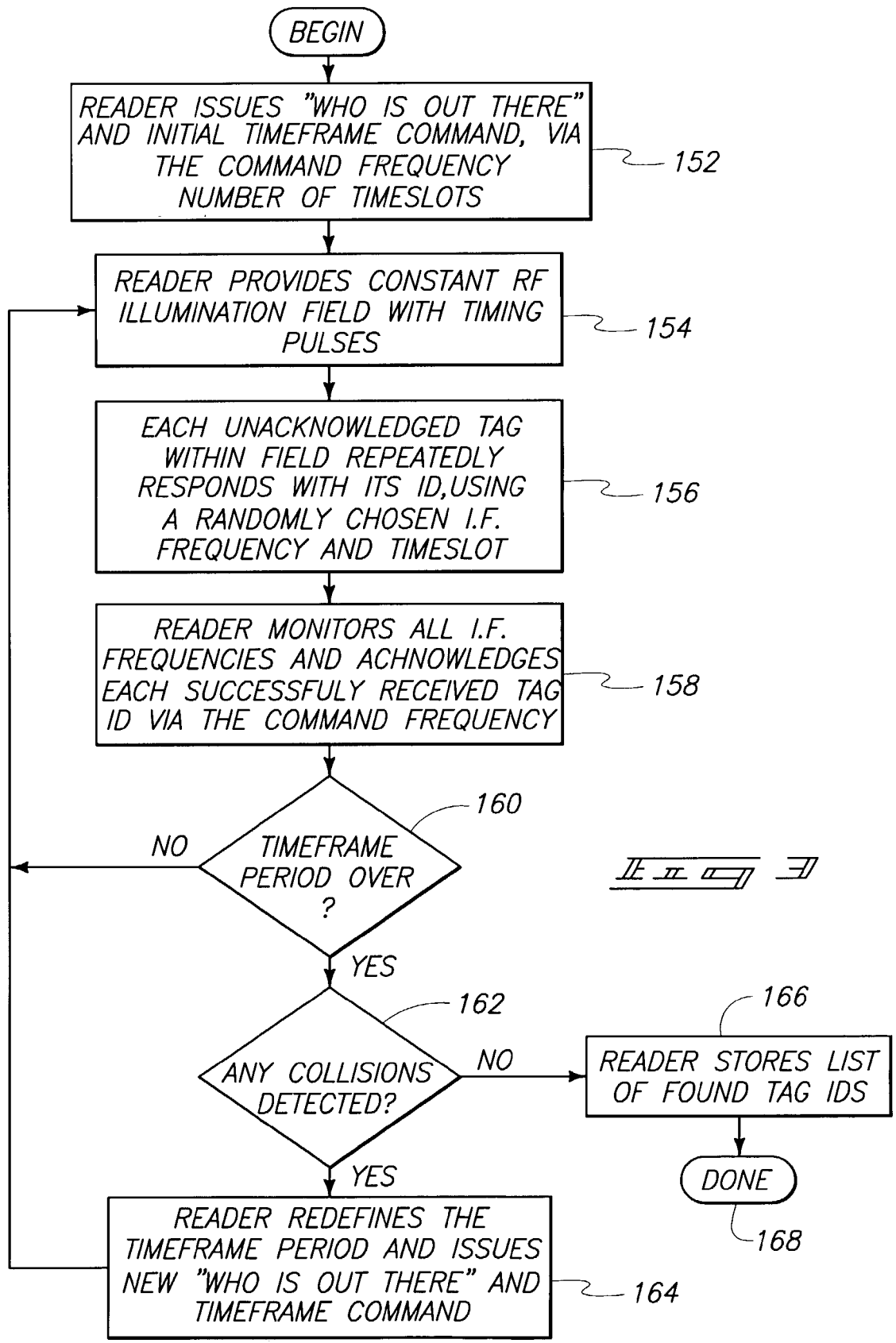
FIG. 3 is a flowchart illustrating operation in accordance with another embodiment of the invention.

FIG. 3 is a flowchart illustrating logic embodied in the reader 32 for discovering the RF tags 44 within area 60 according to an alternative embodiment, generally corresponding to one possible duplex mode of communication.

In step 152, in which the reader 32 issues a "discovery" command signal 36 on a certain command frequency, requesting all as-yet unidentified RF tags 44 in area 60 to enter the discovery mode and respond with their respective tag IDs 52. In addition, the reader 32 issues a number of 'timeslots' (i.e., discrete time periods) within the initial discovery timeframe, by way of a signal 36. For example, the initial timeframe reference may have six timeslots. Any number of initial timeslots are possible. The timeslots could be defined, for example, by the reader 32 briefly interrupting illumination.

In step 154, the reader 32 illuminates field 60 with continuous RF energy modulated with timing information (i.e., pulses) such that the RF tags 44 within the area 60 remain synchronized with the reader 32. In one embodiment, each time pulse designates the beginning of a timeslot within the timeframe reference. Timing pulses could be, for example, the brief removal of RF illumination. Other embodiments are possible.

In step 156 of FIG. 3, each RF tag 44 within area 60 independently responds to the discovery command by sending its respective tag ID 52 by way of signal 40, during a randomly selected timeslot within the initially-defined timeframe and at an IF frequency (i.e., channel) selected from a number of available frequencies monitored by reader 32. During step 156, each tag 44 is configured to repeatedly respond to the discovery command, using a newly selected, random, timeslot and IF frequency, until the initial timeframe period (i.e., the number of initially-defined timeslots) has elapsed. All RF tags 44 respond at least once during the timeframe period.

In step 158, which is at least partially overlapping with step 154 and is overlapping with step 156, the reader 32 simultaneously monitors all of the IF frequencies, reading and recording each successfully received tag ID 52. As each tag ID 52 is successfully read (i.e., no collision), the reader 32 acknowledges the corresponding RF tag 44 on the command frequency. In response, each acknowledged RF tag 44, exits the discovery mode and ceases to respond further to the present discovery command. Also during step 158, the reader 32 detects and records the number of any collisions that may occur, as well as the number of successfully received tag IDs 52.

In step 160 of FIG. 3, the reader 32 determines if the initial timeframe has elapsed. If not, the reader 32 proceeds to step 154. If so, the reader 32 proceeds to step 162. In step 162, the reader 32 determines if any collisions were detected during monitoring step 158. If no collisions occurred, then the reader 32 has successfully discovered the tag ID 52 of all the RF tags 44 within area 60 during the initial discovery timeframe, and the reader 32 proceeds to step 166.

In step 166, the reader 32 stores the list of tag IDs 52 for later use for communication between the reader 32 and the tags 44. Finally, the sequence of FIG. 3 ends with step 168.

If collisions were detected in step 158, the reader 32 proceeds to step 164.

In step 164, the reader 32 re-defines the timeframe period (i.e., selects a new number of timeslots to define the period) and issues a new discovery command, including the new timeframe definition, on the command frequency by way of a signal 36. The new discovery command is intended for those RF tags 44 whose tag IDs 52 were not successfully received and acknowledged by reader 32 during the initial timeframe. Those RF tags 44 are aware of this failure due to the lack of acknowledgement on the part of the reader 32.

After the new discovery and timeframe command is issued by reader 32, the reader 32 proceeds to step 154. The steps 154, 156, 158, 160, 162 and 164 of the logic sequence of FIG. 3 are repeated until no collisions are detected in step 158, and the iterative process ends with steps 166 and 168, with the reader having successfully received the tag ID 52 of all RF tags 44 in area 60.

The reader 32 is configured to optimize the length of the timeframe (i.e., number of timeslots) for the next iteration of discovery. In one embodiment, this optimization includes halving, doubling, or leaving unchanged the timeframe period (i.e., three possible options), responsive to a comparison of the number of successfully received tag IDs 52 relative to the number of collisions detected during the previous timeframe period, though other alternatives are possible. For example, if relatively few collisions were detected, the reader may select to reduce; e.g., halve (in terms of whole numbers of timeslots) the length of the timeframe for the next discovery iteration, in an attempt to accelerate the overall discovery process.

In contrast, a relatively large number of detected collisions might result in the reader 32 increasing; e.g., doubling the length of the timeframe, in an attempt to give all un-discovered RF tags 44 more timeslots in which to attempt discovery (i.e., respond) during the next iteration. Other embodiments and optimization methods are possible.

To further clarify the concepts of multiple timeslots and IF frequencies, reference is now made to FIG. 4, which provides an example time and frequency plot of an RF tag discovery process according to one possible duplex-mode embodiment of the invention, generally referred to as numeral 200. As shown, the plot 200 includes: IF frequency range 202 shown along the vertical axis; and timeframe 204 shown along the horizontal axis. In the illustrated embodiment, IF frequency range 202 includes eight discrete frequencies (i.e., channels) for communication from RF tags back to an reader (the RF tags and the reader are not shown in FIG. 4). Other embodiments may include any number of IF frequencies.

The timeframe 204, as shown in plot 200, includes ten timeslots 206. The number of timeslots 206 per timeframe 204 can vary from embodiment to embodiment, and may vary from time to time within a given embodiment as a result of discovery optimization (previously described). Plot 200 further includes a plurality of empty timeslots and IF frequency event cells 212, in which no RF tag identification discovery is attempted (i.e., no response activity).

The plot 200 further illustrates a plurality of sequential, simultaneous acquisitions and collisions, beginning with acquisition instance 208. The acquisition instance 208 illustrates the successful discovery of an RF tag having identification code 1, during timeslot number 1 on IF frequency 2. Further illustrated is collision 210, in which RF tags having respective identification codes 6 and 14 have attempted to respond to a discovery command at the same time and on the same IF frequency. RF tags 6 and 14 are "aware" of the collision 210 by virtue of their respective responses going unacknowledged by the reader. Consequently, both RF tags 6 and 14 will repeat their respective responses, shown as successful acquisitions 216 and 218.

In timeslot number 2, acquisition instances 220, 222 and 224 occur, in which RF tags 19, 20 and 4 are simultaneously discovered by the reader, on IF frequencies 7, 3 and 2, respectively.

Plot 200 further illustrates additional acquisition instances and collisions, with the final such event being acquisition instance 214, in which RF tag 16 is discovered in timeslot 10 on IF frequency 2.

The overall example illustrated by plot 200 is the successful discovery to twenty different RF tags, and the occurrence of five collisions, during the course of timeframe 204. Other example discovery sequences corresponding to different embodiments of the invention are possible, comprising some or all of the same aspects as those illustrated in plot 200.

Referring now to FIG. 5, which provides an example time and frequency plot of an RF tag discovery process according to one possible simplex-mode embodiment of the invention, generally referred to as numeral 250. As shown, the plot 250 includes IF frequency range 202 shown along the vertical axis, and timeframe 204 shown along the horizontal axis, generally corresponding as described above. In the illustrated embodiment, range 202 includes eight discrete frequencies for communication from RF tags back to a reader (not shown). Other embodiments may include any number of IF frequencies.

The timeframe 254 includes eight timeslots 256. The number of timeslots 256 per timeframe 254 can vary from embodiment to embodiment, and may vary from time to time within a given embodiment as a result of discovery optimization, as described above. Plot 250 further includes a plurality of empty timeslots and IF frequency event cells 262, in which no RF tag identification discovery is attempted (i.e., no response activity).

The plot 250 further illustrates a plurality of sequential, simultaneous acquisitions and collisions, initiated by the issuance of a discovery command from a reader (not shown), and beginning with acquisition instance 258. The acquisition instance 258 illustrates the successful discovery of an RF tag having identification code 1, during timeslot number 1 on IF frequency 2.

Further illustrated is collision 260, in which RF tags having respective identification codes 6 and 14 have attempted to respond to a discovery command at the same time and on the same IF frequency. It is assumed in viewing FIG. 5 that none of the tags attempting to communicate (i.e., identify themselves) to the reader are aware if their respective attempts are successful until acknowledged by the reader after timeframe 254 has elapsed. Consequently, both RF tags 6 and 14 will have to repeat their identification respective responses (detailed hereafter).

In timeslot number 2, acquisition instances 264, 266 and 268 occur, in which RF tags 19, 20 and 4 are simultaneously discovered by the reader, on IF frequencies 7, 3 and 2, respectively. Throughout timeframe 254, tags 3, 6, 10, 12, 14 and 16 will experience collisions during their respective attempts to identify themselves to the reader, while other tags numbered 1–20 will successfully identify themselves to the reader.

Referring now to FIG. 6, which is a continuation of the plot 250 introduced above. It is assumed that the reader sent acknowledgements to those tags within the range 1–20 which were successful (i.e., not involved in a collision during timeframe 254) in identifying themselves to the reader, after timeframe 254 ended. Thereafter, the reader issued a re-randomize command to all un-acknowledged tags, having a new timeframe definition 270, in response to detecting collision events (for example, collision 260) during timeframe 254. The timeframe 270 includes three timeslots 256.

During the course of timeframe 270, acquisition events 272, 274, 276 and 278 occur respectively representing the successful identification of tags 3, 10, 12 and 14 to the reader. Also occurring during timeframe 270 is a collision event 280, in which tags 6 and 16 un-successfully attempt to identify themselves to the reader during timeslot 2, on IF frequency 4. At the end of timeframe 270, the reader acknowledges tags 3, 10, 12 and 14, and issues another re-randomize command, having a new timeframe definition 282, in response to detecting collision 280.

Reference is now directed to FIG. 7, which completes the plot 250 introduced above. The timeframe 282 has a single timeslot 256. During the course of timeframe 282, acquisition events 284 and 286 occur, corresponding to the successful identification of tags 6 and 16 to the reader. Also during timeframe 282, no collision events occur; thus the reader is aware that no more tags are left to be discovered. The reader then acknowledges tags 6 and 16 after the termination of timeframe 282. The discovery of all tags 1–20, as collectively illustrated in FIGS. 5–7, is now complete.

The overall example illustrated by plot 250 is the successful discovery to twenty different RF tags, and the occurrence of four collisions, during the course of timeframes 254, 270 and 282. Other example discovery sequences corresponding to different simplex embodiments of the invention are possible, comprising some or all of the same aspects as those illustrated in plot 250.

Referring now to FIG. 8, which provides an exemplary timeline substantially corresponding to the RF tag discovery process of plot 250 described above, and generally referred to as numeral 300. The timeline 300 includes three sequential timeframes 302, 304 and 306, respectively.

The timeline 300 begins at time 308, in which a reader (not shown in FIG. 8) issues a discovery (i.e., "who is out there") command to all RF tags (not shown in FIG. 8) within working proximity, using a command frequency. The discovery command includes the initial timeframe 302 definition of ten seconds total time.

During the timeframe 302, the reader monitors all available IF frequencies (as previously described), counting and acknowledging RF tag identifications as they are successfully received, using the command frequency, and counting the number of detected collisions. During the timeframe 302, events 310 occur, which comprise the successful discovery of fourteen RF tags and the detection of three collisions. The timeframe 302 ends at time 312.

At time 312, the reader evaluates the number of acknowledgements with respect to the number of collisions, and issues a re-randomize command having a second timeframe 304 definition to those RF tags involved in the collisions (other tags have left the discovery mode due to acknowledgement). The timeframe 304 is defined as three seconds total; seven seconds less than that of prior timeframe 302, in an effort to optimize (i.e., accelerate) the discovery process. During the timeframe 304, events 314 occur in which four RF tags are successfully discovered and acknowledged, and one collision occurs.

At time 316, the reader evaluates the events 314 and issues another re-randomize command having a timeframe definition 306, of one second total. During the timeframe 306, events 318 occur, in which two RF tags are successfully discovered and no collisions are detected.

At time 320, the reader evaluates events 318 and determines that all RF tags in working proximity have been discovered (by virtue of detecting no collisions), twenty tags in all, over the course of three timeframes comprising 14 seconds total. No further discovery iterations are required, and the timeline 300 is complete.

The timeline 300 described above consists of timeframes 302, 304 and 306, having time periods defined in whole seconds for simplicity of illustration. It is understood that timeframes having different—and in particular, much shorter—total periods are possible, with a timeframe having a total period on a scale of milliseconds being readily within the scope of the invention. Other embodiments, having respective timeframe definitions established by a corresponding reader, are also possible.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of identifying RF tags, the method comprising:
   issuing a wireless command using a reader, requesting that RF tags identify themselves;
   illuminating a plurality of RF tags with a radio frequency field using the reader, the reader accepting responses during a predetermined timeframe which includes a plurality of timeslots;
   respective RF tags randomly selecting a radio frequency and a timeslot from a plurality of pre-defined radio frequencies and timeslots;
   respective RF tags issuing a wireless response to the command, including information identifying the tag, using the selected radio frequency and timeslot;
   receiving the wireless responses with the reader;
   issuing wireless acknowledgements from the reader to RF tags that have been successfully identified responsive to the receiving and at the end of the timeframe; and
   if any collision was detected, the reader issuing a command to cause unacknowledged RF tags to randomly select a radio frequency and timeslot for another response.

2. A method of identifying RF tags using a reader, the method comprising:
   issuing a wireless command, using the reader, requesting that RF tags identify themselves;
   providing a radio frequency illumination field using the reader, the reader accepting responses during a predetermined timeframe;
   defining a plurality of consecutive timeslots, within the timeframe, using the reader, by interruption of a carrier;
   monitoring a plurality of radio frequencies simultaneously during each of the a plurality of consecutive timeslots, using the reader;
   receiving a plurality of wireless responses responsive to the command, at different ones of the radio frequencies and timeslots, using the reader;
   issuing wireless acknowledgements from the reader to RF tags that have been successfully identified responsive to the receiving and at the end of the timeframe; and
   if any collision was detected, the reader issuing a command to cause unacknowledged RF tags to randomly select a radio frequency and timeslot in which to provide another response, after issuing the wireless acknowledgements.

3. A method in accordance with claim 2 wherein the receiving comprises simultaneously receiving at least two wireless responses at different radio frequencies.

4. A method in accordance with claim 2 and further comprising determining, using the reader, whether a collision occurred between responses and, if so, issuing another wireless command, using the reader, requesting that RF tags identify themselves.

5. A method in accordance with claim 2 wherein issuing the wireless command further comprises transmitting the timeframe definition to the RF tags.

6. A method in accordance with claim 5 wherein, if a collision was detected, the reader issues a second timeframe definition different from the first timeframe definition.

7. A radio frequency identification system, comprising:
   an RF reader configured to issue an RF command requesting that RF tags identify themselves, to provide a continuous RF illumination field during a timeframe, and to receive responses in any of a plurality of predefined timeslots, within the timeframe, and frequencies; and a plurality of RF tags respectively including an identification number; wherein the plurality of RF tags are configured to respond to the RF command from the RF reader by transmitting their respective identification numbers by way of backscatter modulation of the RF illumination field, and wherein the RF tags are further respectively configured to select a frequency from the plurality of predefined frequencies, to select a timeslot from the plurality of predefined timeslots, and to respond using the selected frequency and timeslot, and the reader being further configured to issue wireless acknowledgements from the reader to RF tags that were successfully identified responsive to the receiving and at the end of the timeframe and, if any collision was detected, to, after the acknowledgements, issue a command to cause unacknowledged RF tags to randomly select a radio frequency and timeslot for another response.

8. A radio frequency identification system in accordance with claim 7 wherein the RF tags are respectively further configured to respond at least once during the timeframe using the randomly selected frequency and timeslot.

9. A radio frequency identification system in accordance with claim 7 wherein the reader is further configured to simultaneously monitor all of the predefined frequencies during the timeslots.

10. A radio frequency identification system in accordance with claim 9 wherein the reader is further configured to record the identification numbers of tags from which responses were successfully received, and to determine how many responses were successfully received and how many collisions occurred.

11. A radio frequency identification system in accordance with claim 10 wherein the reader is further configured to issue a new command and a different number of the timeslots within a new timeframe, the number of timeslots being selected in response to at least one of the number of responses that were successfully received and the number of collisions that occurred.

12. A radio frequency identification system, comprising:

an RF reader configured to issue an RF command requesting that RF tags identify themselves, to provide a continuous RF illumination field, and to receive responses in any of a plurality of predefined timeslots and frequencies, wherein the reader is further configured to accept responses during a timeframe, wherein a timeframe is defined as a predetermined number of timeslots, wherein the reader is further configured to pre-select the number of the timeslots to be included within the timeframe, and to issue the number of the timeslots within the timeframe to the RF tags after issuing the RF command by interruption of a carrier, wherein the reader is further configured to record the identification numbers of tags from which responses were successfully received, and to determine how many responses were successfully received and how many collisions occurred, wherein the reader is further configured to issue a new command and a different number of the timeslots within a new timeframe, the number of timeslots being selected in response to at least one of the number of responses that were successfully received and the number of collisions that occurred; and a plurality of RF tags respectively including an identification number; wherein the plurality of RF tags are configured to respond to the RF command from the RF reader by transmitting their respective identification numbers by way of backscatter modulation of the RF illumination field, and wherein the RF tags are further respectively configured to select a frequency from the plurality of predefined frequencies, to select a timeslot from the plurality of predefined timeslots, and to respond using the selected frequency and timeslot, to repeatedly randomly select radio frequencies and timeslots and issue wireless responses in the selected radio frequencies and timeslots until acknowledged by the reader, and wherein the reader is further configured to issue respective RF acknowledgements to RF tags for which responses were successfully received by the reader at the end of the timeframe.

13. A radio frequency identification system in accordance with claim 12 wherein the RF tags are further respectively configured to transmit a response to the new command if not yet acknowledged by the reader.

14. A reader for use with an RF tag in an RFID system, the reader comprising:

circuitry configured to selectively transmit a plurality of different types of RF messages including a discovery command having timeframe information, indicating the timeframe during which a response will be processed, and configured to provide an RF illumination field after transmitting a discovery command, wherein the circuitry is further configured to selectively provide a time synchronization signal within the RF illumination field, wherein the circuitry is further configured to simultaneously monitor a plurality of channels, and wherein the circuitry is further configured to selectively issue an RF acknowledgement message, acknowledging successful identification of an RF tag, responsive to successfully receiving identification data from an RF tag on one of the plurality of channels by way of backscatter modulation of the RF illumination field, at the end of the timeframe.

15. A reader in accordance with claim 14, wherein the circuitry is further configured to detect whether a collision occurred between transmissions from different RF tags on at least one of the plurality of channels, and to selectively transmit another discovery command having timeframe information responsive to detecting the collision.

* * * * *

UNITED STATES PATENT AND TRADEMARK OFFICE
CERTIFICATE OF CORRECTION

PATENT NO. : 6,995,655 B2 Page 1 of 1
APPLICATION NO. : 10/263809
DATED : February 7, 2006
INVENTOR(S) : Ertin et al.

It is certified that error appears in the above-identified patent and that said Letters Patent is hereby corrected as shown below:

Page 2, OTHER PUBLICATIONS, first column, line 25, please delete "RAdi" after "Methods," and insert --Radio--.

Col. 3, line 31, please delete "inventors" after "by" and insert --inventor--.

Col. 3, line 51, please delete "R.W>" after "inventors" and insert --R.W.--.

Col. 5, line 35, please delete "tags." after "RF" and insert --tags--.

Col. 7, line 20, please delete "an" after "to" and insert --a--.

Col. 10, line 37, claim 2, please delete "a" after "the".

Signed and Sealed this

Third Day of June, 2008

JON W. DUDAS
*Director of the United States Patent and Trademark Office*